United States Patent
Hamamatsu et al.

[11] Patent Number: 6,103,424
[45] Date of Patent: Aug. 15, 2000

[54] RECTANGULAR BATTERY

[75] Inventors: Takeo Hamamatsu; Masao Inoue, both of Tokushima; Takashi Nagase; Satoru Kometani, both of Itano-gun; Nobuyoshi Oi; Hirofumi Sako, both of Tokushima; Hiroshi Sato, Oe-gun; Tadashi Ise, Itano-gun; Yasushi Kuroda, Tokushima, all of Japan

[73] Assignee: Sanyo Electric Co., Ltd., Moriguchi, Japan

[21] Appl. No.: 09/038,133

[22] Filed: Mar. 11, 1998

[30]     Foreign Application Priority Data

Mar. 12, 1997  [JP]  Japan .................................. 9-057598
Mar. 13, 1997  [JP]  Japan .................................. 9-058206
Sep. 30, 1997  [JP]  Japan .................................. 9-265939

[51] Int. Cl.[7] .............................. H01M 4/64; H01M 4/70; H01M 2/26; H01M 10/30
[52] U.S. Cl. ........................... 429/233; 429/60; 429/161; 429/206; 429/208; 429/241
[58] Field of Search .............................. 429/60, 149, 153, 429/154, 160, 161, 163, 206, 208, 233, 239–241, 223, 218.2

[56]     References Cited

U.S. PATENT DOCUMENTS 4,307,161  12/1981  Brown ...................................... 429/120
5,721,073   2/1998  Matumura et al. ..................... 429/223
5,773,163   6/1998  Suzuki et al. ............................. 429/60

FOREIGN PATENT DOCUMENTS 5-47366    2/1993   Japan .
5-62707    3/1993   Japan .
5-299116  11/1993   Japan .
6-4537     2/1994   Japan .

*Primary Examiner*—Maria Nuzzolillo
*Assistant Examiner*—Jonathan Crepeau
*Attorney, Agent, or Firm*—Wenderoth, Lind & Ponack, L.L.P.

[57]     ABSTRACT

A rectangular battery having an electrode group which is inserted in a battery case having an airtight structure. The electrode group is formed by alternately stacking positive electrodes and negative electrodes via separators. The battery case is rectangular had has a closed bottom and an open part that is airtightly sealed by a cover. The outermost electrodes, which are located on both faces of the electrode group, are coated with an active material on a surface of a core. Furthermore, the outermost electrodes have the same polarity and the cores thereof directly contact an inside surface of the outer battery case. In one embodiment, the capacity of the outermost electrodes is smaller than the capacity of the inwardly disposed electrodes of the same polarity.

19 Claims, 11 Drawing Sheets

PRIOR ART

RECTANGULAR BATTERY

BACKGROUND OF THE INVENTION

The present invention relates to a rectangular battery comprising an electrode group composed of positive electrodes and negative electrodes, inserted and airtightly sealed in a rectangular battery case.

With the recent increase of small size portable apparatuses the demand for rechargeable batteries has also increased. And especially with the development of small size, thin type and space efficient apparatuses, the demand for rectangular rechargeable batteries has rapidly augmented.

The rectangular rechargeable batteries are composed of an electrode group placed into an airtightly sealed rectangular battery case. In the widely used alkaline rechargeable batteries, the positive electrodes use a nickel hydroxide as the active substance and a hydrogen absorbing alloy is used in the negative electrode. Collector tabs are spot welded and electrically connected to the positive electrodes and to the negative electrodes which are stacked with separators as insulators. The electrode group is placed in the rectangular battery case and airtightly sealed. The collector tabs, which are connected to the positive electrodes, are connected to the positive pole terminal.

The metallic battery case that includes the electrode group generally has its open portion airtightly sealed by means of a laser welded or caulked metallic cover. The method used to airtightly seal the open part of the rectangular battery by laser welding does not require an open part with local very special properties, compared with the open part of a battery case to be sealed by caulking.

The rectangular batteries mounted in electronic apparatuses have excellent space efficiency properties. But compared with cylindrical type batteries, they have the drawback of a worse volumetric energy density. For example, the volumetric energy density of a nickel hydrogen cylindrical battery reaches 200–220 Wh/l, and for a nickel hydrogen rectangular battery it is reduced as much as 170–190 Wh/l. Because rectangular type batteries have excellent space efficiency properties, if the volumetric energy density could be improved, in the condition where the batteries are grouped, the volumetric energy density can be fairly augmented.

To allow the improvement of the volumetric energy density of the rectangular type batteries, the electrode group composed of stacked positive electrodes and negative electrodes, has to be strongly pressed to high density and inserted into the battery case. However, in comparison with cylindrical batteries, it is extremely difficult to introduce into the battery case the high-density positive and negative electrodes of the rectangular batteries. This is because when inserting the electrode group, one part of the active substance is peeled off at the open part of the battery case and falls off from the surface of the core. The active substance that has fallen off from the core, not only degrades the electrical characteristics of the electrode group, but also considerably reduces the efficiency of the rectangular battery. The reason is that the active substance that has adhered to the open part of the battery case impedes the airtight welding of the open part. When airtightly welding the circumference of the cover to the open part of the battery case of a rectangular battery by laser welding, the airtight sealing of the cover on the battery case will become impossible if some active material, in even a very small amount, adheres to the region to be laser welded. In the case of the structure where the battery case is airtightly sealed by caulking, it is extremely difficult to airtightly seal the corners and furthermore, because the active substance tends to easily adhere to these parts, the airtight sealing of the battery case is extremely difficult. For this reason, even if there is a demand for rectangular batteries with an electrode group having a much higher density inserted under pressure into the battery case, it becomes more difficult to insert inside the battery case under pressure and with a high density, the electrode group from which the active material has fallen off of the core. Therefore, it is fairly difficult to improve the volumetric energy density of a rectangular battery.

Rectangular batteries have two problems, as is hereunder described, that are not applicable in cylindrical batteries, and which make the insertion of a high density electrode group extremely difficult. The first problem occurs at the four corners of the rectangular case. When inserting the rectangular electrode group into the rectangular case, the active substance is easily peeled off of the electrode group at the four corners of the rectangular case. Then particularly, when the high density electrode group is being inserted into the battery case without any gaps, this drawback becomes much more important. Because the width of the electrode group and the inner width of the battery case are almost the same, the corners of the electrode group rub against the four corners of the battery case during the insertion process, and thus the active substance can be easily peeled off. In particular, when the electrode group is composed of many stacked layers of positive electrodes, negative electrodes and separators, it is fairly difficult to make its outer circumference with exactly the same shape as the inner circumference of the battery case. The outer shape of the electrode group is irregular due to components sliding out of position during the stacking process and to width differences between the positive electrode and the negative electrode. A further drawback is that when airtightly welding the cover to the battery case, a gas leak especially occurs at the corners where the active material has adhered and is impeding the tight closing of the battery case by the cover. To avoid this drawback, the width of the positive electrodes and of the negative electrodes is made narrower, and thus the substantial area of the pole plates becomes smaller and the volumetric energy density is reduced leading to another drawback.

Furthermore, rectangular batteries can for example be laminated with U-shape negative electrodes and positive electrodes nipped in between. The rectangular battery of this structure allows mass production with good efficiently because one electrode is laminated with a U-shape, and then with a reduced overall number of electrodes it is possible to augment the number of laminated plates. However, as shown in FIGS. 1 and 2, the drawback is that when inserting the electrode group of this structure into the battery case, the layer of active material on the surfaces near the U-shape core peels off due to rubbing against the open part of the battery case. As shown in FIG. 1, in the pole plate group 2 which is bent with a U-shape at the bottom of the pole plate, the active material 8 coated on the surface near the U-shaped part of the core 7 is peeled off by the open part when inserting the lower part into the open part of the battery case 1. Then, as shown in FIG. 2, in the electrodes bent in a U-shape at the lateral side of the electrode group 22, the peeling off of the active material 28 coated on the surface near the U-shape part of the core 27 occurs when inserting the pole plate group 22 into the battery case 21.

To prevent these drawbacks, which are particular to the rectangular batteries, a technique has been developed in which the surface of the electrode group 32 is covered with the metallic cover 312 which is bent with a horizontal U-shape and inserted into the battery case 31 (patent publication 6-4537). The rectangular battery of this structure has the characteristic of efficiently avoiding the falling off of the active material from the electrode group 32 when it is inserted into the battery case 31, because the metallic cover 312 can be inserted into the battery case 31 while rubbing against the inner face of the battery case 31. However, in the rectangular battery of this structure, because a metallic cover, which does not generate electricity, is placed between the electrode group 32 and the battery case 31, the size of electrode group 32 that can placed into the battery case 31, is reduced. For this reason, the metallic cover 312 has the drawback of reducing the volumetric energy density of the square type battery.

As above described, improving the volumetric energy density of the rectangular battery has been thoroughly researched, but the problem is that the realization of a solution is extremely difficult. Especially, the low price mass production of improved volumetric energy density rectangular batteries requires a furthermore difficult technique.

The first object of the present invention is to develop and realize the aforementioned technique and other important objects of the present invention are to prevent the adherence of the active material to the open part of the battery case when inserting the electrode group into the battery case and to propose a rectangular battery with an airtightly sealed battery case.

Then, other significant objects of the present invention are to improve the volumetric energy density of the rectangular battery with a fairly simple structure and furthermore to offer rectangular batteries which allow low price mass production.

Furthermore, the nickel hydrogen batteries, which recently are widely in use and which tend to replace the nickel-cadmium batteries, have the extreme characteristic of deteriorating the negative electrode due to the gaseous oxygen produced when the battery is fully charged. This is because the gaseous oxygen produced when the positive electrodes are fully charged, penetrates through the separators, spreads in the negative electrodes and adversely affects the negative electrodes.

FIG. 4 shows an electrode group of a nickel hydrogen battery, and the following is an explanation of the principle of the action of the gaseous oxygen which has a harmful effect on the negative electrodes.

The electrode group 42 is inserted into the rectangular sealed battery case. The electrode group is composed of positive electrodes 44 which use nickel hydroxide as the active material, and of negative electrodes 43 which use hydrogen absorbing alloy as the active substance 48. The positive electrodes 44 and the negative electrodes 43 are stacked with separators 45.

The nickel metal hydride battery is a battery that electrochemically uses the reversible reaction of emission of the occlusion of hydrogen in the case of the hydrogen absorbing alloy. FIG. 5 and FIG. 6 show the charge and discharge reactions of the negative electrodes 43 and of the positive electrodes 44. As shown in FIG. 5, when charging, by electrolysis reaction of water, the atomic hydrogen that has appeared on the surface of the hydrogen absorbing alloy 48A of the negative electrodes spreads and is included inside the inner part of the hydrogen absorbing alloy 48A. When discharging, as shown in FIG. 6, the occluded hydrogen reacts with the hydroxide ions at the surface of the hydrogen absorbing alloy and again becomes water. Therefore, the electrode reaction, which occurs via the hydrogen and the hydrogen absorbing alloy 48A, acts as a hydrogen tank.

Furthermore, when the charging process of the nickel metal hydride battery proceeds, and after the positive electrodes of small electrode capacity have been first fully charged, the gaseous oxygen appears by the following reaction.

$$4OH^- \rightarrow 2H_2O + O_2 + 4e^-$$

Because the electrode capacity of the negative electrodes has been designed to be larger than the positive electrodes, gaseous hydrogen should theoretically not be produced. The gaseous oxygen that appears at the positive electrodes penetrates the separators and spreads out in the negative electrodes, oxidizing the hydrogen of the hydrogen absorbing alloy, which is in the charged condition, and water is formed according to the following reaction.

$$4MH + O_2 \rightarrow 4M + 2H_2O$$

Then the water formed by this reaction is consumed by the charging reaction of the following formula:

$$M + H_2O + e^- \rightarrow MH + OH^-$$

Furthermore, the gaseous oxygen, which was formed at the positive electrodes, is consumed by the following electrochemical reaction:

$$O_2 + 2H_2O + 4e^- \rightarrow 4OH^-$$

As above described, a sealed structure is realized in which the gaseous oxygen, which was formed at the positive electrodes, is consumed at the negative electrodes.

In a nickel metal hydride battery with an electrode group of this structure, the negative electrodes 43 are coated with the hydrogen absorbing alloy that is the active substance 48 on both faces of the core 47. In the nickel metal hydride battery of this structure, the gaseous oxygen, which is formed when the positive electrodes 44 are in the fully charged condition, deteriorates the negative electrodes 43. In particular, the negative electrodes 43, which do not face the positive electrodes 44, that is to say that the negative electrodes 43 in the region facing the battery case identified with the letter A added to the number in FIG. 4 deteriorate much more. Because the negative electrodes 43 in the region A do not face the positive electrodes 44, there is only a little occlusion and emission of hydrogen during the charging and discharging processes, and this is a region of poor electrochemical activity. Therefore, the negative electrodes 43 in the region A are regions of poor reactivity, but this is the region which is attacked by the oxygen that has penetrated into the separators 45 which leads to significant deterioration. When the negative electrodes 43 in this region deteriorate, the internal resistance of the battery augments, the cycle characteristics fall, and as a drawback, the high efficiency discharging quality is worsened.

Furthermore, the negative electrodes in the region A, which do not face the positive electrodes, are not really efficiently used during the charging and discharging processes because this is a region where the reactions of occlusion and emission of hydrogen are not efficient. The drawback is that inside the case, this is a region which is not efficiently used, and for the battery, this is an important loss of volumetric energy density. Especially, in the nickel metal hydride batteries, because a sealed structure is realized which absorbs the gaseous hydrogen in the negative electrodes and because the capacity of the negative electrodes is larger than the capacity of the positive electrodes, and further, if a region cannot be efficiently used, the volumetric energy density will be greatly reduced.

The second object of the present invention is to solve these drawbacks. The object of the present invention is to improve the volumetric energy density and to use the whole negative electrodes with more efficient charging and discharging processes, and furthermore, to offer nickel metal hydride batteries with improved cycle characteristics and a high efficiency discharging quality which allows effective prevention of battery deterioration.

SUMMARY OF THE INVENTION

The rectangular battery of the present invention is composed of an electrode group with positive electrodes and negative electrodes alternatively stacked with separators and inserted into a rectangular shape outer container with a sealed bottom. The open part of the outer containers is airtightly sealed by a cover.

Furthermore, the outermost electrodes of the electrode group are electrodes coated with an active material on both faces of the core and further, the outermost electrodes located on both sides of the electrode group, have the same polarity. Then, furthermore, the surface of the outermost electrodes that is in contact with the outer container is the core protruding face.

In a rectangular battery, the inner face of the battery case and core of the electrodes are conductive, it is possible to electrically connect by pressure welding the core to the inner face of the battery case.

It is possible to laminate the outermost electrodes with a U-shape to nip the electrodes of the other polarity. The U-shape bent outermost electrode of this rectangular battery is the folded thin layer without active material on the surface of the core. The core protruding face is placed towards the face opposed to the battery case of the outermost pole plates to continue the folded thin layer.

The rectangular battery has a sealed battery case composed of an outer container and of a cover. An open part of the rectangular outer container has a cover that is airtightly sealed by laser welding.

As rectangular batteries, it is possible to make nickel metal hydride batteries or nickel-cadmium batteries or the like as rechargeable batteries.

The nickel metal hydride batteries have a core coated with an active material including hydrogen absorbing alloy.

The nickel metal hydride battery mounts the negative electrodes having the active substance of hydrogen absorbing alloy at the external side of the electrode group. The electrode capacity of the outermost negative electrodes is inferior to the capacity of the negative electrodes located at the middle between the positive electrodes.

The electrode capacity of the outermost negative electrodes of the nickel hydrogen batteries has to be from 30 to 70%, preferably 40 to 60% and most preferably 45 to 55% of the electrode capacity of the central negative electrodes.

A non-punched metal, which has essentially no punched holes, is used as the core of the outermost electrodes. The non-punched metal, which has essentially no punched holes, is a metal plate which penetrates the core of the outermost electrodes and which does almost not move the active material on the surface of the core when inserting the stacked electrode group in the outer container. The non-punched metal contains a punched metal opened with microscopic punched holes, which allows almost no penetration of the active material.

The active material is adhered on the non-punched metal surface by means of an adhesive substance, or the active substance is adhered after rugged processing of the surface or the active substance is adhered after plasma processing of the surface.

The core can also be made of punched metal.

In the rectangular battery of the present invention, the core is jointly used with the metal cover of FIG. 3, when inserting the electrode group in the battery case. The core jointly used with the metal cover is formed of a conductive sheet metal of non-punched metal or punched metal or the like, and the face facing the battery case is the core protruding face. Because the core protruding face is the core from which the active material has been removed, when inserting the electrode group into the battery case, the peeling off of the active material from the electrode group is efficiently prevented. Especially, when inserting a rectangular electrode group into a rectangular battery case, the corners of the electrode group are effectively protected and the falling off of the active material is prevented. This is because the core of the electrode is jointly used with the metal cover and not because the surface of the electrode group is covered with another metal cover. In the case of the electrode group, which is to be inserted into the battery case covered with another metal cover, if the metal cover is slightly smaller than the electrode group, the corners of the electrode group protrude from the metal cover and the active substance of the protruding part falls off. To prevent this drawback, the metal cover is made larger, in other words, if the electrode group is made smaller, the substantial volume of the electrode group is reduced and the volumetric energy density is lowered. On the contrary, the rectangular battery of the present invention jointly uses the core of the stacked electrodes in the metal cover, and because the electrode group is inserted into the battery case, the core does not need to be larger than the electrodes. The core covers the whole surface of the outer face of the electrode group and, when inserted into the battery case, the falling off of the active material is efficiently prevented from any part including from the corners.

Furthermore, when inserting the electrode group composed of the stacked and U-shape bent outermost electrodes into the rectangular battery case, there is no risk of the active material falling off in the neighborhood of the U-shape part of the electrode plate because the core protruding face of the outermost electrode is facing the battery case, then the falling off of the high density electrode group is prevented and it can be inserted into the battery case. For this reason, the rectangular battery of the present invention can improve the volumetric energy density.

Furthermore, if the open part of the battery case is stained by the active material, this will not cause a reduction of the airtightness of the connecting part of the outer container of the negative electrode, and thus the battery case can be airtightly sealed by welding or another method. This is because the falling off of the active material from the electrode group is prevented upon insertion into the battery case and because the cover can be airtightly sealed by welding or by other methods.

The above and further objects and features of the present invention will more fully be apparent from the following detailed description taken in conjunction with the accompanying drawings.

DETAILED DESCRIPTION OF THE INVENTION

First Embodiment

Figure 7:
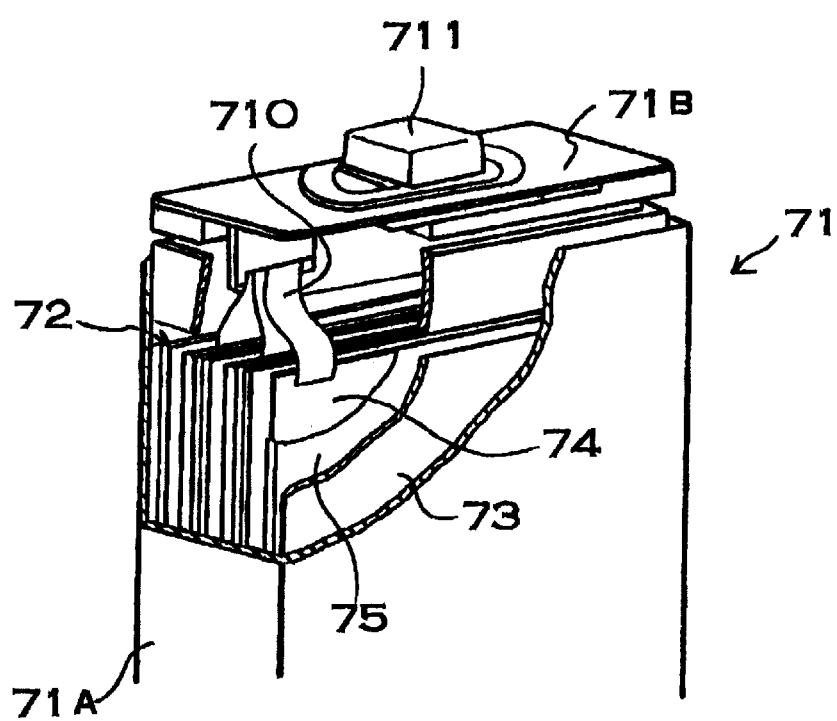
FIG. 7 is a partial cross-sectional perspective view of the rectangular battery constructed in accordance with a first embodiment of the present invention.

The square type battery shown in FIG. 7 contains an electrode group 72 inside a sealed battery case 71. The battery case 71 is composed of the outer container 71A into which is inserted the electrode group 72 and of the cover 71B which airtightly seals the open part of the outer container 71A. The outer container has at least a conductive inner face because the negative electrode 73 is pressure welded and electrically connected to the inner face. The outer container 71A of this structure is generally a metal case. However, a case provided with a conductive layer inside a plastic case, can be used. The plastic outer containers are airtightly sealed by heat depositing of a plastic cover.

The following is the detailed explanation of the first embodiment of the rectangular battery which is a nickel metal hydride battery being an alkaline rechargeable battery. However, the present invention does not limit the rectangular batteries to the alkaline rechargeable batteries that are nickel rechargeable batteries. The rectangular battery of the present invention can use any type of battery which inserts an electrode group, coated with an active material on the surface of the core, into a battery case.

Figure 8:
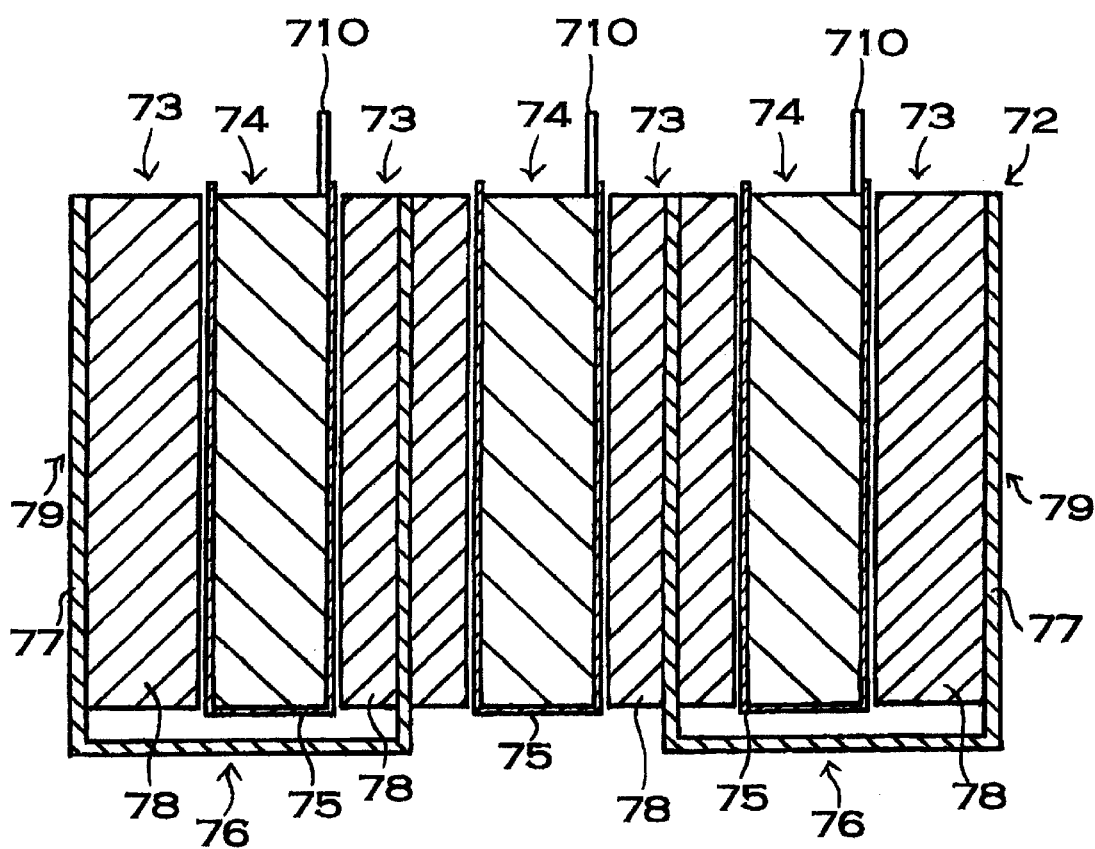
FIG. 8 is a cross-sectional view of the electrode group of the rectangular battery shown in FIG. 7.

FIG. 8 shows a cross-sectional structure of the electrode group. The electrode group 72 is composed of two negative electrodes 73 and three positive electrodes 74. A negative electrode 73 is bent by the folded thin layer placed with a belt shape at the middle, and nipping in between a positive electrode 74 which is enveloped by the separator 75. The folded thin layer has no active material 78 on both faces of the core 77. It is ideal to remove the totality of the active material deposited on the surface of the core, but a small amount of active material can remain providing that the folded thin layer can be folded.

The negative pole plate 73 is processed to coat the hydrogen absorbing alloy that is the active substance 78, on the surface of the core 77. The core 77 uses a punched metal sheet or a non-punched metal sheet. The non-punched metal sheet is a thin metal foil that has no punched holes. The core, which is a non-punched metal, has an adhesive substance coated on its surface or has a surface made active by surface plasma processing, or has a surface which is pre-processed by sand blasting to obtain a minute rugged surface, thereby allowing a peeling off-resistant gluing of the active material. Adhesive substances like polyvinyl-alcohol synthetic resin adhesive can be used as the adhesive substance. When using a polyvinyl-alcohol as adhesive substance, it is first coated and dried on the surface of the core and the active material is coated over it.

A binder is added to the active material 78 which is made in a slurry condition and then coated with a constant thickness on the surface of the core 77. The binder of the active material slurry is hardened after having been coated on the surface of the core 77.

The negative electrode 73 is not coated with the active material 78 on the whole surface of the core 77. With the negative electrode 73, the active material 78 is not coated on the surface facing the battery case of the outermost electrode. The outermost electrode is only coated with the active material 78 on the face facing the positive electrode 74. Furthermore, the folded thin layer 76, which has bent the negative electrodes 73, is not coated with the active material 78 on both faces of the core 77.

To allow partial coating of the active material 78, the active material is either coated on one part of the core 77, or after having coated the active material slurry on the whole surface of the core 77, and before the hardening by means of a binder, the active material slurry is scraped away with a blade thereby removing the active material 78 from the core protruding face 79 and from the folded thin layer 76.

Figure 9:
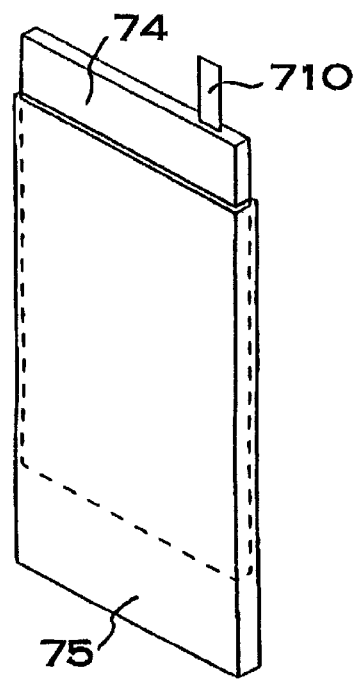
FIG. 9 is a perspective view of the process of inserting the positive electrode, shown in the FIG. 7, into a separator.

As shown in FIG. 9, the positive electrode 74 keeps the nickel hydroxide and the collector tab 710 is welded to the base. The separator 75 is made of a non-woven fabric strip formed like a pouch wrapping and holding the positive electrode 74 and insulating the positive electrode 74 from the negative electrodes 73.

The above described positive electrodes and negative electrodes are assembled as follows to form the electrode group and furthermore, assembled into the battery case to form a rectangular battery.

1. The negative electrode 73 is first bent with a U-shape at the central folded thin layer.
2. Then, the positive electrode 74 wrapped into the separator 75, is nipped between the negative electrodes 73 bent with a U-shape.
3. The electrode group 72 of the structure shown in FIG. 8 is assembled by nipping the positive electrode 74 wrapped with the separator 75, between the pair of negative electrodes 73 which nip the positive electrode 74.
4. Then the collector tab 710 of the positive electrode 74 is connected by welding to the positive pole terminal 711 of the cover 71B.

5. The electrode group 72 is inserted into the outer container 71A which is a rectangular shaped tube with a sealed rectangular bottom. The outer container 71A is a metallic case.

The electrode group 72, which has been inserted into the battery case 71, makes the folded thin layer 76 in contact with the bottom face of the battery case 71. Then the negative electrode 73 which is the outermost electrode of the electrode group 72, is electrically connected by pressure welding the core protruding face 79 to the inner face of the battery case 71. Therefore, the electrode group 72, inserted into the battery case, allows no vibration and fits to the battery case.

Thereafter, the electrolyte KOH is poured into the battery case 71 from the open part, and the cover 71B which is provided with a positive pole terminal 711 is inserted next in the open part of the battery case 71. Then, the connecting part of the cover 71B and of the open part of the battery case 71 is welded by laser irradiation and the cover 71B is airtightly sealed and fixed to the open part of the battery case 71.

The rectangular battery of the first embodiment of the present invention is realized by the above described process. A comparative battery has been manufactured to prove the excellent characteristics of the rectangular battery of the present invention. The comparative battery has the structure shown in FIG. 4, which shows the structure of the electrode group. That is to say that the negative electrode 43 which is the outermost electrode is coated with active material 48 on both faces of the core 47. Besides the change in the coating condition of the active material 48, the rest of the structure is the same as the former electrode group. Especially, the total amount of active material 48 coated on the surface of the core 47, is unchanged. The manufacturing method is identical to the rectangular battery of the first embodiment.

1000 pieces of rectangular batteries of the first embodiment of the present invention and also 1000 pieces of rectangular batteries of the comparative embodiment have been manufactured in order to judge the quality of the welding part between the negative electrode and the battery case. Then, 1000 pieces of rectangular batteries of the first embodiment of the present invention have been further manufactured with the core 77 of the negative electrode 72 using punched metal and also 1000 pieces using non-punched metal. To judge the quality of the welded part, after having manufactured the rectangular batteries and left them for a period of 60 days, the defective proportion of batteries showing a leak of alkaline electrolyte from the open part, has been measured.

The rectangular batteries using a punched metal in the core of the negative electrode use a punched metal in the core of all the negative electrodes. Further, the rectangular battery using a non-punched metal in the core of the negative electrode, uses a non-punched metal only in the negative electrode which is the outermost electrode and uses a punched metal in the core of the other negative electrodes. However, it is also possible to use a non-punched metal in the cores of all the negative electrodes or to use a non-punched metal only in the cores of the electrodes connected to the outermost electrode and to use a punched metal in the other cores of the negative electrodes.

The defective proportion of the open part of the rectangular batteries of the first embodiment of the present invention was 0%. On the contrary, the defective proportion of the open part of the rectangular batteries of the comparative embodiment reached 1.6%, that is to say that a leak at the open part has been found in 16 of the 1000 pieces of batteries.

This way, the rectangular batteries of the present invention can decrease the percentage of deficient covers because the core protruding part, being the part in contact with the battery case 71 of the outermost electrode of the electrode group 72, the surface of the electrode group 72 is not scraped by contact of the battery case when introduced into the rectangular battery case 71, and therefore the open part of the outer container 71A of the rectangular battery of the present invention can be airtightly sealed by laser welding or the like because the active material 78 does not fall off.

With the rectangular battery of the comparative embodiment, when inserting the electrode group 42 into the battery case 41, the active material 48 which has been coated on the surface of the electrode group 42 is scraped and falls off, and the active material 48 which has fallen off becomes an impurity that adheres to the welding region of the cover 41B and the battery case 41 thereby impeding the welding and leading to reduced sealing efficiency due to the occurrence of pin holes etc.

Furthermore, when the discharging rate characteristics of the rectangular battery of the present invention tested in the aforementioned first embodiment and of the comparative battery were compared with the rectangular battery of the first embodiment of the present invention, the high rate discharge characteristics of more than 1C were improved several %. The reason is that the rectangular battery of the present invention improved the high rate discharge characteristics with an excellent collecting ability because the core protruding face is directly electrically connected to the battery case. In the rectangular battery of the comparative embodiment, because the outermost electrode is in contact with the battery case via the active substance and not via the core, the collecting ability is degraded which reduces the high rate discharge characteristics.

To clarify the effect of the core protruding face, the same amount of active material has been coated onto the negative electrodes of the aforementioned rectangular batteries of the comparative embodiment and on the rectangular battery of the present invention. In the case of the rectangular battery of the present invention, it is possible to augment the quantity of active material coated on the core during the real process of manufacturing the rectangular battery, because the falling off of the active material can be efficiently prevented during insertion into the battery case. This is why, even if a large amount of active material is coated, it can be inserted into the battery case in the condition where the both faces of the electrode group are pressed by the core protruding face, i.e. covered by the metal cover. Therefore, the rectangular battery of the present invention has the characteristics of allowing the augmentation of the amount of active material, and to allow the insertion of a high efficiency electrode group into the battery case in a manner which decreases considerably the leakage caused by the active material.

Furthermore, in the first embodiment of the present invention, when comparing the particularities of rectangular batteries using a punched metal in the core of the negative electrodes and with rectangular batteries using a non-punched metal, the rectangular batteries using a non-punched metal show better characteristics. When comparing negative electrodes using a non-punched metal in the core, with negative electrodes of punched metal, the active material coated at the surface has a better resistance to peeling and, as negative electrodes, the filling up density is higher.

Negative electrodes using punched metal and non-punched metal in the core have been manufactured and tested as described in the following items 1 to 5. The items 1 to 5 relate to electrodes without active material on one face.

1. negative electrodes of punched metal with a non-processed surface and coated with active material
2. negative electrodes of non-punched metal with a non-processed surface and coated with active material
3. negative electrodes of non-punched metal coated on the surface with an adhesive substance then coated with active substance
4. negative electrodes of non-punched metal with a sandblasted roughened surface then coated with active material on the roughened surface
5. negative electrodes of non-punched metal with a plasma processed surface then coated with active material The falling off of the active material has been tested as follows on the negative electrodes manufactured and tested as here above. Grooves forming a 10×10 mm checker have been carved on the face coated with the active material of the negative electrodes, by means of a cutter, and an adhesive tape has been adhered on these surfaces. The number of active materials which peeled off due to adherence on the adhesive tape was measured and the falling off percentage of the active material was measured.

The falling off percentage of the negative electrodes of the items 1 to 5 was as follows:

negative electrodes of 1 . . . 99%;
negative electrodes of 2 . . . 90%;
negative electrodes of 3 . . . 75%;
negative electrodes of 4 . . . 80%; and
negative electrodes of 5 . . . 80%.

According to these measurement conditions, the falling off of the active material is less on negative electrodes using non-punched metal in the core and the excellent resistance of the electrodes due to the strong adherence to the surface of the core has been demonstrated. Especially the active material coated on the surface of the processed non-punched metal showed the most excellent characteristics.

Furthermore, the electrode group with negative electrodes using a core of non-punched metal has the characteristic of allowing insertion into the outer container in an ideal condition. This is because the active material does not move on the core protruding surface through the punched holes of the core because there are no punched holes in the core composing the core protruding surface of the outermost electrode. When the electrode group is inserted into the outer container, the adherence of the active material onto the open part of the outer container is limited because there is absolutely no active material coated on the core protruding face and also because penetrating the core, the active substance does not move on the core protruding face.

Furthermore, the measurements of the filling up densities when rolling in the same conditions (10 t/cm$^2$) the negative electrodes of the aforementioned items 1 to 5, are as follows.

negative electrodes of 1 . . . 5.0 g/cc;
negative electrodes of 2 . . . 5.2 g/cc;
negative electrodes of 3 . . . 5.2 g/cc;
negative electrodes of 4 . . . 5.2 g/cc; and
negative electrodes of 5 . . . 5.2 g/cc.

As shown above, the filling up density is higher in the negative electrodes of non-punched metal than in negative electrodes of punched metal core. The reason is that the active material is equally filled on the surface of the core. Because in the case of the punched metal, the active material is filled into the punched holes, the filling up density is supposed to be augmented but in fact it is difficult to fill the active material particles with a high density in the punched holes by rolling. This is because it is not possible to smoothly move the active material particles by rolling and to press them into the punched holes. Since it has no punched holes, the non-punched metal can be made thin and resistant. For this reason, the negative electrodes using non-punched metal can use a thin core augmenting the quantity of the active material compared with the overall volume of the negative electrodes.

A rectangular battery using a non-punched metal in the core of the negative electrodes has been, as described above, realized with more excellent battery characteristics.

The aforementioned first embodiment has been explained by the example a rectangular battery airtightly fixing the outer container and the cover by laser welding. But, the present invention is not limited to laser welding the structure to airtightly fix the outer container and the cover. The battery case and the cover can also be airtightly assembled by other welding methods, and the cover can be airtightly caulked. In this case, there is no need to say that the same results as in the aforementioned first embodiment can be expected.

Second Embodiment

A nickel metal hydride battery is manufactured with the same structure as in the first embodiment. This nickel metal hydride battery includes an electrode group of the structure shown in the cross-sectional view of the FIG. 10.

The electrode group 102 was manufactured employing the same method as the electrode group 72 of the first embodiment.

In the outermost electrode 103A, the active material 108 is only coated on the face which faces the positive electrode. The capacity of the electrode of the outermost negative electrode 103A is half of the capacity of the electrode of the central negative electrode 103B located between the positive electrodes 104.

The electrode capacity of half the electrode capacity of the central negative electrode 103B is ideal for the outermost negative electrodes 103A. If the electrode capacity of the outermost negative electrodes 103A is less than half, or conversely, it is more than half the electrode capacity of the central negative electrodes, the balance between the electrode capacity and the facing positive electrode 104, is worsened.

When the electrode capacity of the outermost negative electrodes 103A is less than half, the gaseous oxygen, which is produced at the facing positive electrode 104, cannot be efficiently absorbed by the negative electrodes 103. On the contrary, when the electrode capacity of the outermost negative electrodes 103A is larger than half of the electrode capacity of the central negative electrode 103B, the negative electrodes 103 can easily deteriorate because regions of low electrochemical activity augment.

Therefore, the electrode capacity of the outermost negative electrodes 103A is set in the span of 30 to 70% of the electrode capacity of the central negative electrodes 103B, preferably from 40 to 60% and most preferably between 45 and 55%.

The electrode capacity of the outermost negative electrodes 103A is set less than the central negative electrodes 103B capacity. But, the electrode capacity of the totality of the negative electrodes is designed to be superior to the electrode capacity of the totality of the positive electrodes, because the gaseous oxygen which is produced when the battery overcharges, after it is fully charged, is consumed by the negative electrodes 103.

The active material 108 is partially coated on the surface of the core 107 with the same method as in the first embodiment.

The positive electrodes 104 are manufactured with the same method as in the first embodiment.

The negative electrodes 103 and the positive electrodes 104 of the above described structure, are mounted in a nickel metal hydride battery using the same method as in the battery of the first embodiment.

Figure 1:
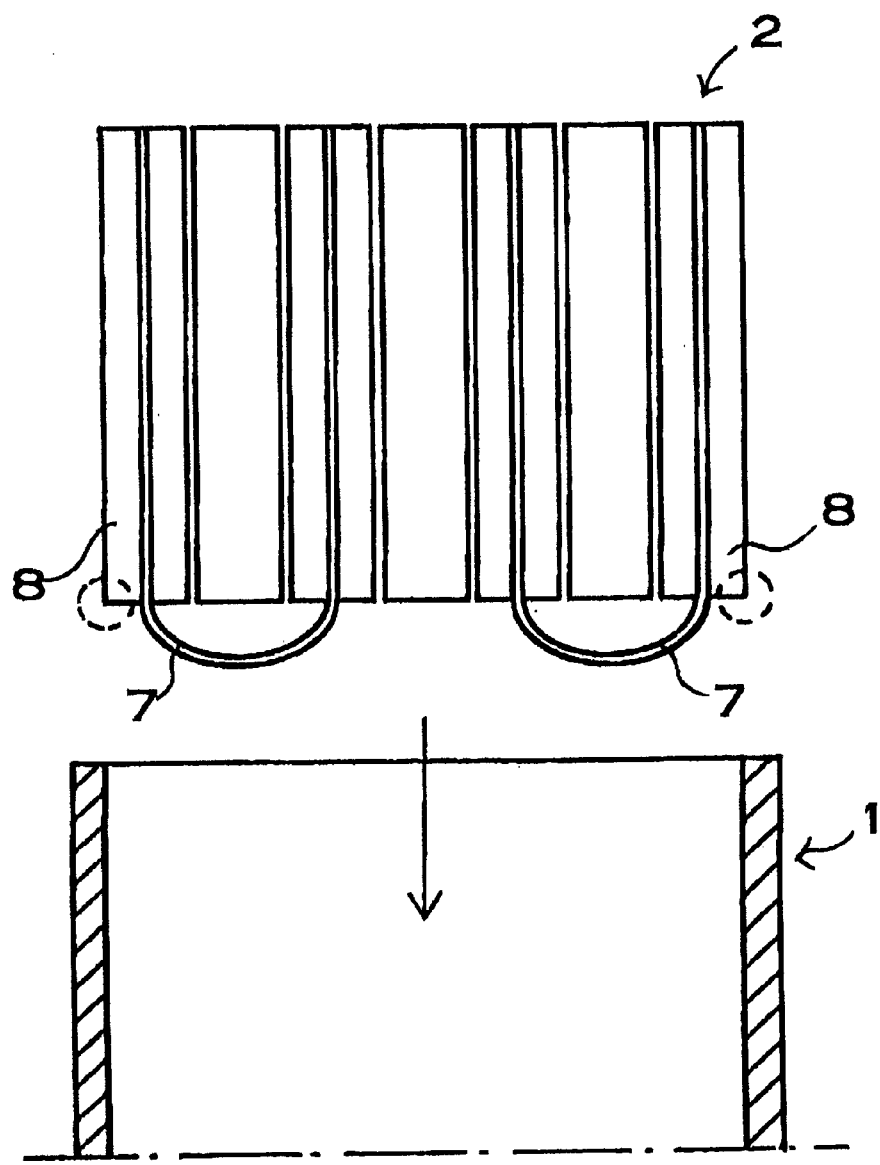
FIG. 1 is a cross-sectional view of the inserting process of an electrode group of a prior art rectangular battery into a battery case.
Figure 2:
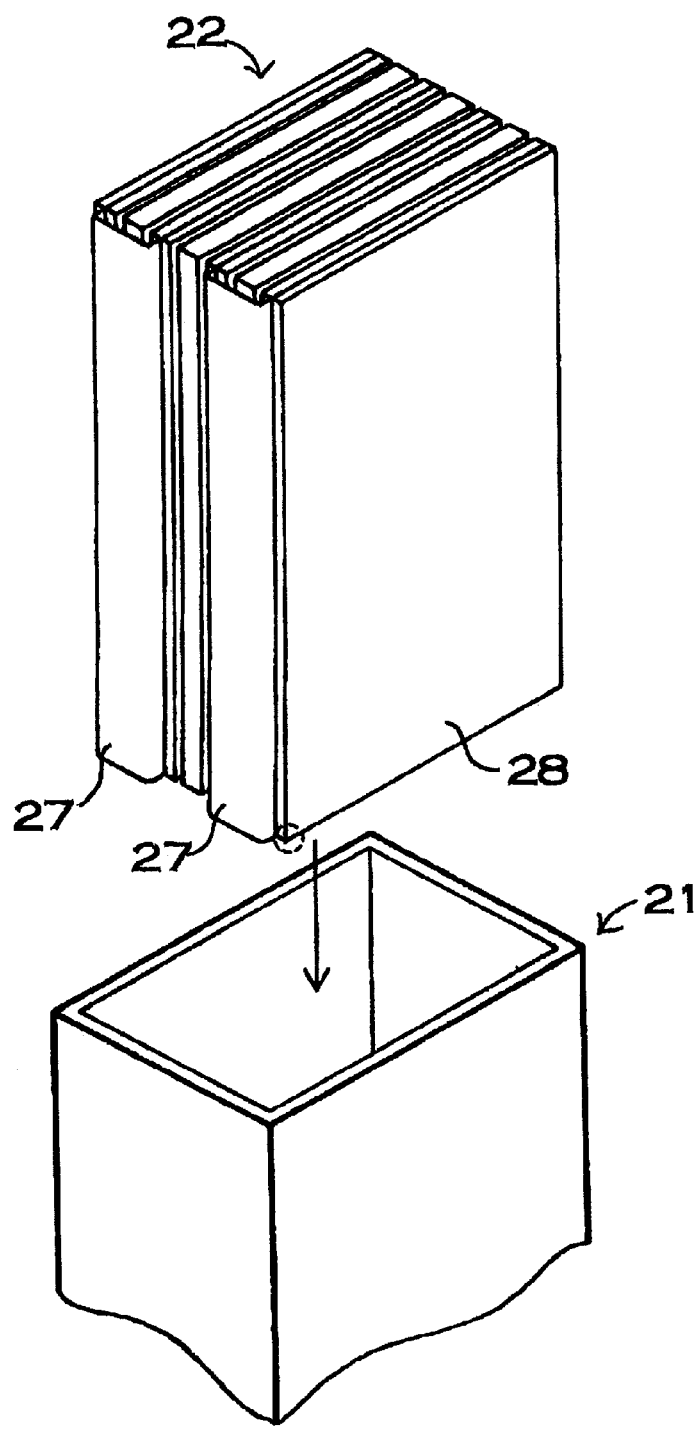
FIG. 2 is a perspective view of the inserting process of the electrode group of another prior art rectangular battery into the battery case.
Figure 3:
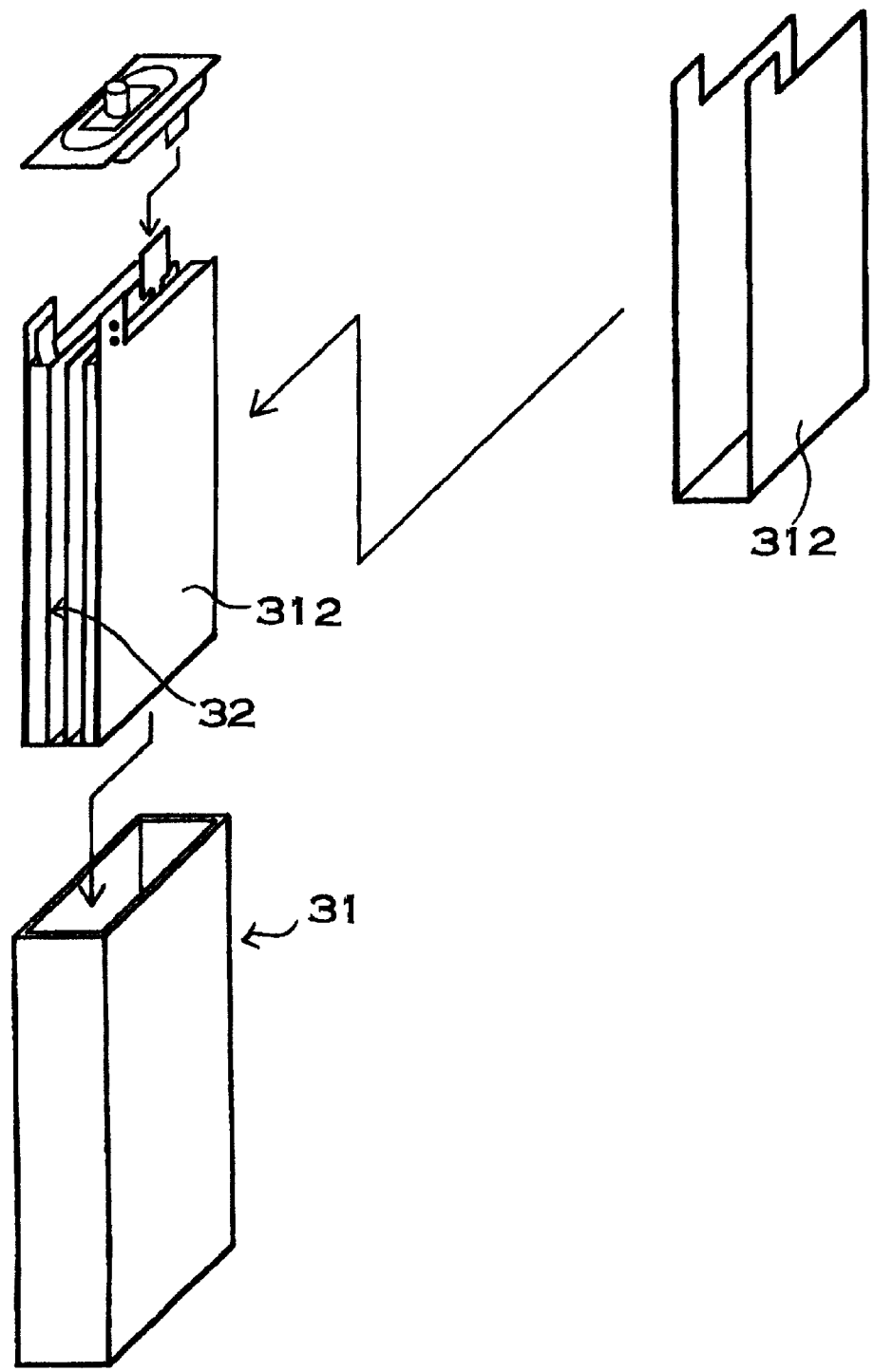
FIG. 3 is a partial perspective view of the inserting process of the electrode group of another prior art rectangular battery, which is covered with a metal cover, into the battery case.
Figure 4:
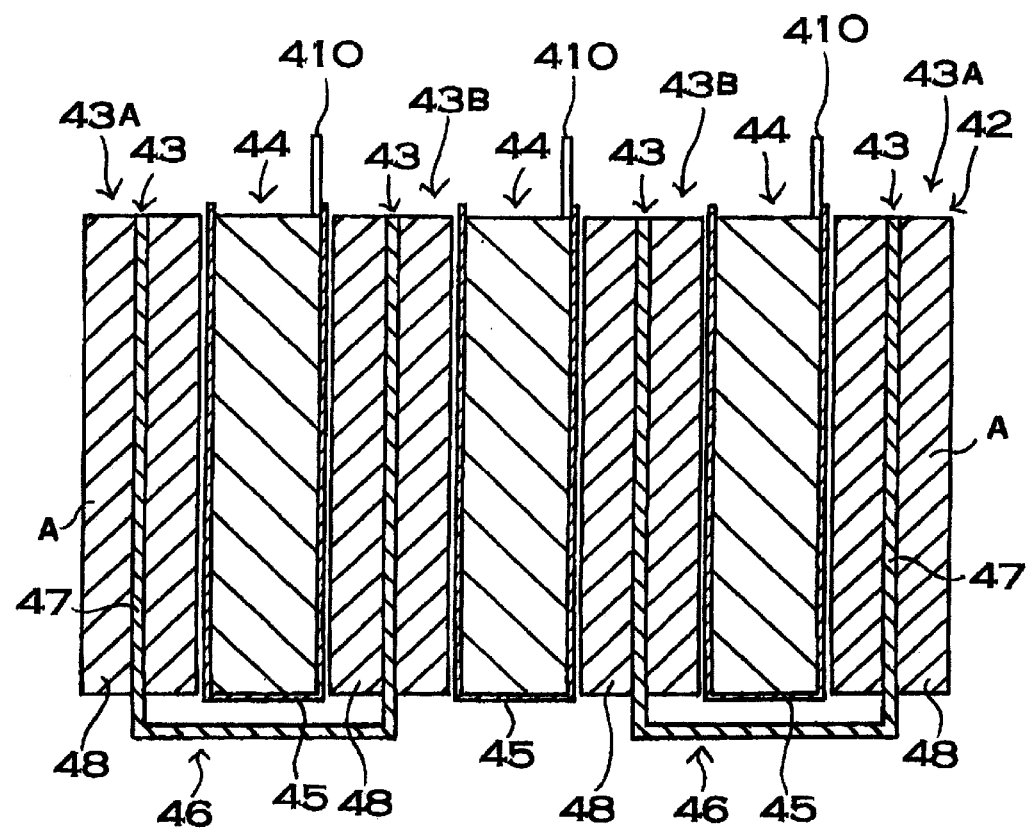
FIG. 4 is a cross-sectional view of the structure of the electrode group of the square type battery of a prior art nickel metal hydride battery.
Figure 5:
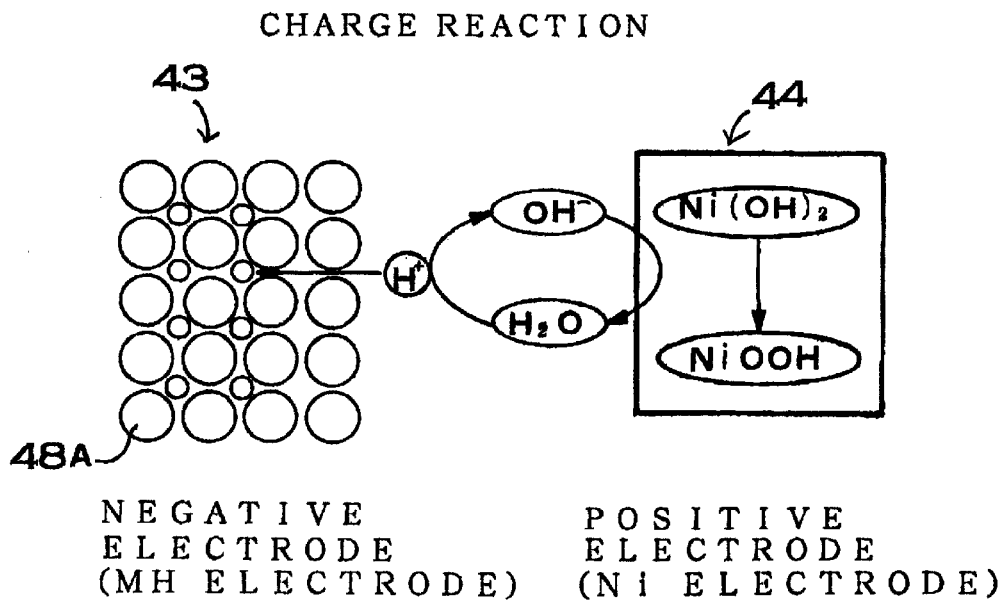
FIG. 5 is a schematic view showing the pole reaction which occurs during the charging of the nickel metal hydride battery.
Figure 6:
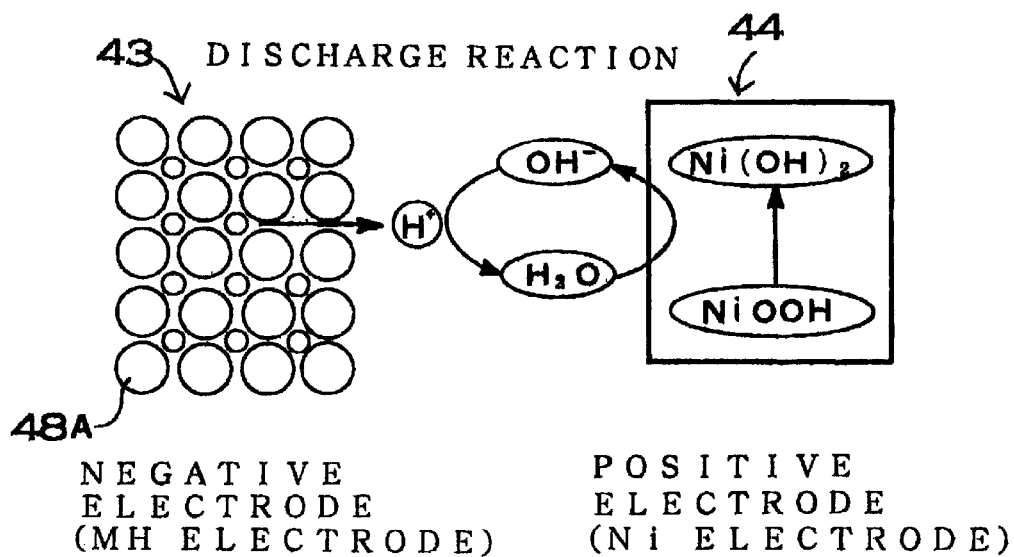
FIG. 6 is a schematic view of the pole reaction which occurs during the discharging of the nickel metal hydride battery.

The nickel metal hydride battery of the second embodiment of the present invention has been realized by the aforementioned process. A comparative battery of the nickel metal hydride battery of the second embodiment has been manufactured and tested to demonstrate its excellent properties. The structure of the electrode group of the comparative battery has the same structure as shown in FIG. 4. That is to say that the electrode capacities of the outermost negative electrodes 43A and of the central negative electrodes 43B are the same, and also that both faces of the core 47 are coated with the active material 48. Besides changing the coating condition of the active material 48, the electrode group 102 is the same as discussed previously. Especially, the whole quantity of active materials 48, 108 coated on the surface of the cores 47, 107 is the same. The manufacturing method also is the same as for the nickel metal hydride battery of the aforementioned second embodiment.

Figure 11:
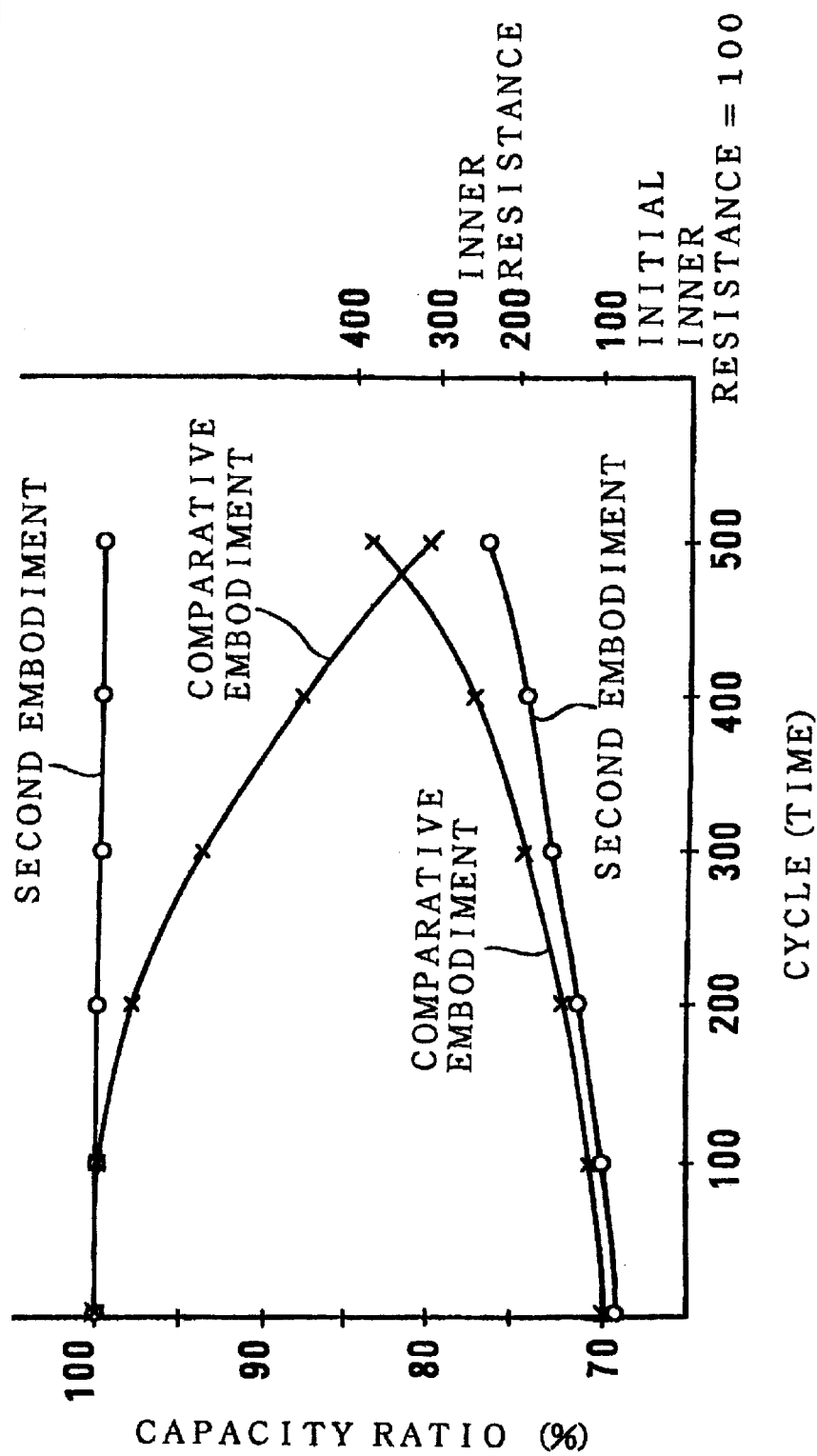
FIG. 11 is a graph showing the changes in the internal resistance and the cycle characteristics of the nickel metal hydride battery of the second embodiment of the present invention and of the nickel metal hydride battery of a comparative embodiment.

FIG. 11 shows the comparison of the cycle particularities between the nickel metal hydride battery of the present invention and the comparative battery. But these cycle particularities have measured the charge current and the discharge current at 1C. From this figure it is clear that the cycle particularities of the nickel metal hydride battery of the second embodiment are greatly improved. Even after 500 repeated charges and discharges the nickel metal hydride battery of the second embodiment showed almost no reduction in the discharge capacity that could really be used. Furthermore, compared with the comparative battery, the augmentation of the inner resistance is fairly small showing its excellent electrical characteristics. However, the inner resistance, taking the initial inner resistance as 100, shows a relative rate. The nickel metal hydride battery of the second embodiment shows these excellent electrical characteristics because the negative electrodes 103 and the positive electrodes 104 are well balanced and also because the collecting capability has been improved due to the direct electrical contact of the core protruding face 109 with the battery case.

Figure 12:
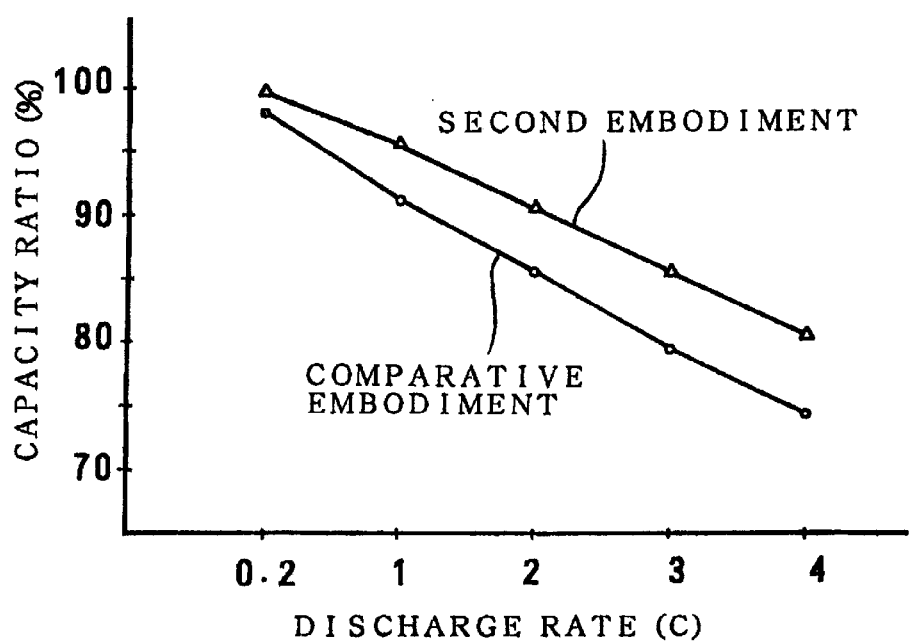
FIG. 12 is a graph showing the discharging rates of the nickel metal hydride battery of the second embodiment of the present invention and of the nickel metal hydride battery of a comparative embodiment.

Furthermore, FIG. 12 shows the comparison between the discharge rate characteristics of the nickel metal hydride battery manufactured and tested in the second embodiment and of the comparative battery. As is evident from this figure, the nickel metal hydride battery of the second embodiment has discharge rate characteristics which are considerably improved. Thus, the nickel metal hydride battery provided with the core protruding face 109 at the outermost negative electrodes 103A shows excellent electrical characteristics because on the one hand the outermost negative electrodes 103A and the positive electrodes 104 are mounted facing each other with electrode capacities in an ideal condition, and on the other hand the totality of the active material 108 of the outermost negative electrodes 103A is coated more on the positive electrode side than on the core 107 and efficiently used for the charge and discharge. And furthermore, excellent electrical characteristics are exhibited because the core 107 is directly pressure welded to the outer container and electrically connected in an ideal condition.

Figure 10:
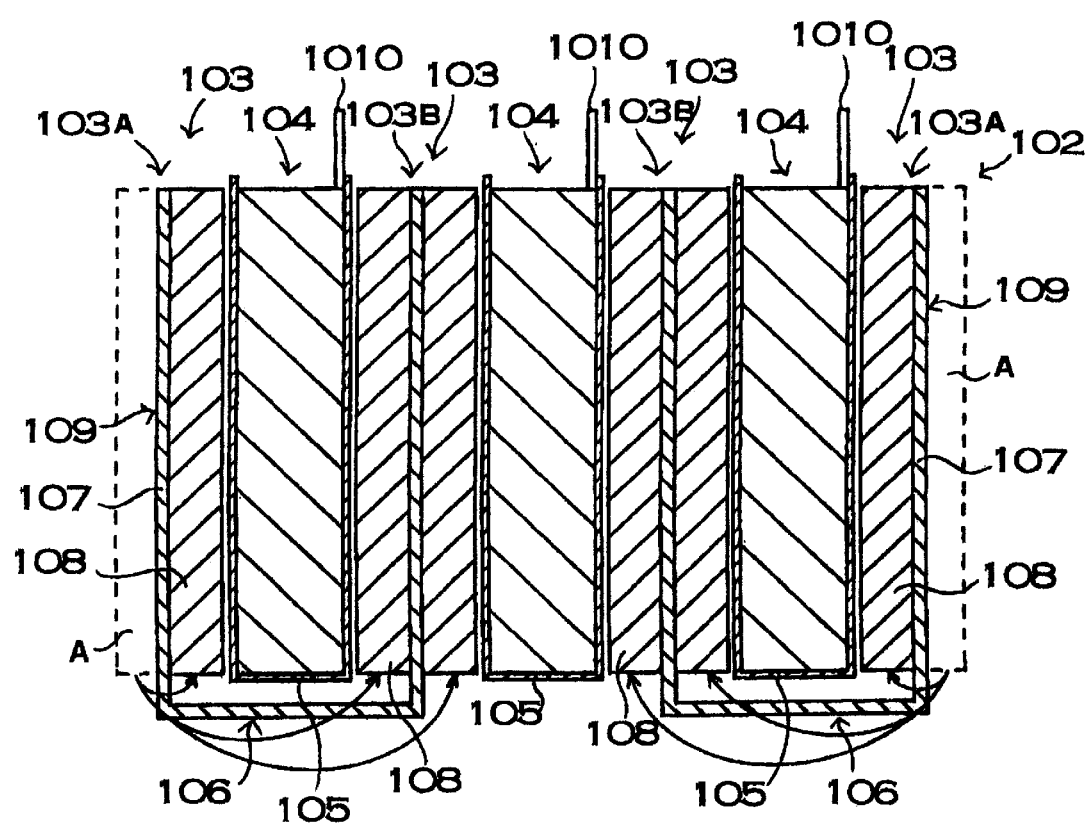
FIG. 10 is a cross-sectional view of the electrode group of the nickel metal hydride constructed in accordance with a second embodiment of the present invention.

The nickel metal hydride battery of the second embodiment has no negative electrode 103 in the region A shown by the dotted line in FIG. 10, and the capacity of the outermost negative electrodes 103A is smaller than the electrode capacity of the central negative electrodes 103B, which are mounted between the positive electrodes 104. Because the part shown by the region A of the negative electrodes 103 does not face the positive electrodes 104, it becomes a region of low electrochemical activity and the reaction of hydrogen absorbing emission does not efficiently occur. Because the battery includes positive electrodes 104 and negative electrodes 103 inside a case having a fixed inner volume, the nickel metal hydride battery without the negative electrode 103 of the region A can divided and distribute the negative electrode of the region A, as shown by the arrows in FIG. 10, to the places which face the positive electrodes 104.

For example, with the nickel metal hydride battery of FIG. 4, when the electrode capacity of the outermost negative electrodes 43A and of the central negative electrodes 43B is six, that is to say a total of twelve, with the nickel metal hydride battery of FIG. 10, because the negative pole of the region A of the outermost negative electrodes 103A can be dispersed to the other three regions, the electrode capacity of the outermost negative electrodes 103A can be four, the electrode capacity of the central negative electrodes 103B can be eight with a total of twelve. For this reason, augmenting the electrode capacity of the negative electrodes 103 that really produce an absorbing emission reaction with the hydrogen, and furthermore reducing the quantity of the negative poles of the region of low electrochemical activity, the battery degradation, although it is attacked by the oxygen and especially the degradation during high rate discharge can be prevented with the improved cycle characteristics.

As this invention may be embodied in several forms without departing from the spirit or essential characteristics thereof, the present embodiment is therefore to be considered illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A battery comprising:
   a rectangular battery case including a container having a closed bottom end, an open top end, and a cover sealed on said open top end of said container such that said battery case is airtight; and
   an electrode group inserted into said container, said electrode group including:
   a plurality of negative electrodes;
   a plurality of positive electrodes, wherein said negative and positive electrodes are stacked alternately and define first and second outermost electrodes, wherein said first and second outermost electrodes are disposed on opposite ends of said electrode group and have the same polarity;
   separators for separating said positive electrodes from said negative electrodes,
   wherein each of said first and second outermost electrodes includes a core plate having an inner surface facing an adjacent electrode and an outer surface facing and directly contacting an inner surface of said battery case; and
   an active substance held on said inner surface of said core plate, wherein said core plate outer surface has no active material thereon.

2. The battery as claimed in claim 1, wherein said core plates of said first and second outermost electrodes are electrically connected to said inner surfaces of said container by pressure welding.

3. The battery as claimed in claim 1, wherein said core plate of said first outermost electrode is connected to a core plate of a succeeding electrode having the same polarity via a thin metal plate such that said core plates and said thin metal plate form a U-shaped member, and one of said electrodes having an opposite polarity, with respect to said first outermost electrode, is interposed between said core plates forming said U-shaped member.

4. The battery as claimed in claim 1, wherein said cover is laser welded on said open end of said container.

5. The battery as claimed in claim 1, wherein said first and second outermost electrodes are negative electrodes, each of said first and second outermost electrodes has a capacity that is smaller than said negative electrodes which are disposed inwardly of said first and second outermost electrodes and are interposed between two of said positive electrodes.

6. The battery as claimed in claim 5, wherein said capacity of each of said first and second outermost negative electrodes is 30 to 70% of the capacity of said inwardly disposed negative electrodes.

7. The battery as claimed in claim 1, wherein said battery is an alkaline rechargeable battery.

8. The battery as claimed in claim 1, wherein said battery is a nickel metal hydride battery.

9. The battery as claimed in claim 5, wherein said battery is an alkaline rechargeable battery.

10. The battery as claimed in claim 1, wherein each of said core plates of said first and second outermost plates comprises a metal plate which has substantially no punched holes.

11. The battery as claimed in claim 10, wherein said active material of said first and second outermost electrodes is fixed to said core plates by an adhesive material.

12. The battery as claimed in claim 11, wherein said surfaces of said core plates, on which said active material is adhered, are processed so as to provide roughened surfaces which facilitate adhesion of said active material.

13. The battery as claimed in claim 10, wherein said surfaces of said core plates, on which said active material is adhered, are subjected to plasma processing to facilitate adhesion of said active material.

14. The battery as claimed in claim 1, wherein each of said core plates of said first and second outermost electrodes comprises a metal plate having a plurality of holes punched therein.

15. The battery as claimed in claim 1, wherein each of said first and second outermost electrodes is connected to a closest of said electrodes having the same polarity by a thin metal plate, wherein said core plate of said first outermost electrode, said core plate of said closest electrode having the same polarity and said thin metal plate define a U-shaped structure, and one of said electrodes, having the opposite polarity relative to said outermost electrode, is disposed within said U-shaped structure.

16. A battery comprising:

a battery case; and an electrode group inserted into said battery case, said electrode group including a plurality of positive electrodes, a plurality of negative electrodes, and separators for separating said positive and negative electrodes which are alternately stacked, said negative electrodes defining opposite outermost electrodes of said electrode group, said negative electrodes comprising a core plate holding an active substance formed of hydrogen absorbing alloy, and each of said opposite outermost electrodes being provided with said active substance only on a core plate surface confronting one of said positive electrodes such that a core plate surface of each of said opposite outermost electrodes, which directly confronts said battery case, is not provided with said active substance, wherein each of said negative electrodes has an electrode capacity, and the electrode capacity of said outermost electrodes is smaller than the electrode capacities of said negative electrodes which are disposed inwardly of said outermost electrodes and are interposed between said positive electrodes.

17. The battery as claimed in claim 16, wherein said outermost electrode surfaces, which confront said battery case, are electrically connected by pressure welding to an inner surface of said battery case.

18. The battery as claimed in claim 16, wherein said electrode capacity of said outermost negative electrodes is 30 to 70% of the electrode capacity of said negative electrodes which are disposed inwardly of said outermost negative electrodes.

19. The battery as claimed in claim 16, wherein each of said outermost negative electrodes and said succeeding inner negative electrode comprise a core plate which is bent into a U-shape, a base part of said U-shape is free of said active material, and one of said positive electrodes is disposed between upstanding portions of said U-shaped core plate.

* * * * *